(12) United States Patent
Kelly

(10) Patent No.: US 7,286,690 B2
(45) Date of Patent: Oct. 23, 2007

(54) METHOD FOR IMAGING OF PRE-STACK SEISMIC DATA

(75) Inventor: Steve Michael Kelly, Houston, TX (US)

(73) Assignee: PGS Americas, Inc., Houston, TX (US)

( * ) Notice: Subject to any disclaimer, the term of this patent is extended or adjusted under 35 U.S.C. 154(b) by 730 days.

(21) Appl. No.: 10/692,185

(22) Filed: Oct. 23, 2003

(65) Prior Publication Data

US 2005/0111702 A1 May 26, 2005

(51) Int. Cl.
*G06K 9/00* (2006.01)
(52) U.S. Cl. .................................... 382/109
(58) Field of Classification Search ................ 382/109, 382/128, 130, 131, 154; 702/2
See application file for complete search history.

(56) References Cited

U.S. PATENT DOCUMENTS

| | | | |
|---|---|---|---|
| 5,136,552 A | | 8/1992 | Kelly et al. |
| 5,940,778 A | * | 8/1999 | Marfurt et al. ............... 702/16 |
| 6,049,759 A | * | 4/2000 | Etgen ........................... 702/14 |
| 2003/0220744 A1 | * | 11/2003 | Schonewille ................. 702/14 |

OTHER PUBLICATIONS

Reshef, M. and Kosloff, D., "Migration of common shot gathers", Geophysics, (Feb. 1986), pp. 324-331, vol. 51, No. 2.

Jeannot, J., "Full prestack versus shot record migration: Practical aspects", SEG Expanded Abstracts, 1988, pp. 966-968.

Wapenaar, C. and Berkhout, A., "Full prestack versus shot record migration", SEG Expanded Abstracts, 1987, pp. 761-764.

Reshef, M., "Prestack depth imaging of three-dimensional shot gathers", Geophysics, (Aug. 1991), pp. 1158-1163, vol. 56, No. 8.

Jacobs, A., "The prestack migration of profiles", Ph.D. Thesis, Stanford University, 1982, SEP-34.

Claerbout, J., "Imaging the Earth's Interior", Blackwell Scientific Publications, Ltd., Oxford, Uk, 1985, 1999.

Valenciano, A., Biondi, B., and Guitton, A., "Multidimensional imaging condition for shot profile migation", Stanford Exploration Project, Report SEP-111, 2002, pp. 71-80.

* cited by examiner

*Primary Examiner*—Joseph Mancuso
*Assistant Examiner*—Claire Wang
(74) *Attorney, Agent, or Firm*—E. Eugene Thigpen; Charles R. Schweppe

(57) ABSTRACT

Prestack seismic data is imaged by calculating an individual reflectivity for each frequency in the seismic data. Then, a mean reflectivity is calculating over the individual reflectivities. A variance is calculated for the set of reflectivities versus frequency. A second variance is calculated for the upgoing wavefield, using the mean reflectivity. A spatially varying pre-whitening factor is then calculated, using the variance for the reflectivities and the variance for the upgoing wavefield. A reflectivity is calculated at each location, using the spatially varying pre-whitening factor.

5 Claims, 2 Drawing Sheets

METHOD FOR IMAGING OF PRE-STACK SEISMIC DATA

CROSS-REFERENCES TO RELATED APPLICATIONS

Not Applicable

FEDERALLY SPONSOR RESEARCH OR DEVELOPMENT

Not Applicable

SEQUENCE LISTING, TABLE, OR COMPUTER LISTING

Not Applicable

BACKGROUND OF THE INVENTION

1. Field of the Invention

This invention relates generally to the field of geophysical prospecting. More particularly, the invention relates to the field of seismic data processing. Specifically, the invention is a method for imaging prestack seismic data for seismic migration.

2. Description of the Related Art

Seismic migration is the process of constructing the reflector surfaces defining the subterranean earth layers of interest from the recorded seismic data. Thus, the process of migration provides an image of the earth in depth or time. It is intended to account for both positioning (kinematic) and amplitude (dynamic) effects associated with the transmission and reflection of seismic energy from seismic sources to seismic receivers. Although vertical variations in velocity are the most common, lateral variations are also encountered. These velocity variations arise from several causes, including differential compaction of the earth layers, uplift on the flanks of salt diapers, and variation in depositional dynamics between proximal (shaly) and distal (sandy to carbonaceous) shelf locations.

It has been recognized for many years in the geophysical processing industry that seismic migration should be performed pre-stack and in the depth domain, rather than post-stack, in order to obtain optimal, stacked images in areas with structural complexity. In addition, pre-stack depth migration offers the advantage of optimally preparing the data for subsequent AVO (Amplitude Versus Offset) analysis. Pre-stack depth migration has traditionally been performed through the application of Kirchhoff methods. However, because of recent advances in computing hardware and improvements in the design of efficient extrapolators, methods that are based on solutions of the one-way wave equation are starting to be used.

It has been well established in the literature that wave equation-based methods offer the kinematics advantage of implicitly including multipathing, and can thus more accurately delineate structures underlying a complex overburden. However, there has been considerably less discussion of the dynamic advantages that might (or should) be realized through wave equation-based methods. This is not surprising, since Kirchhoff pre-stack depth migration has undergone a much longer evolution than its wave equation-based counterparts. Part of this evolution has been the development of various factors or strategies to account for geometrical divergence and spatial irregularities in acquisition.

Poststack migration is often inadequate for areas that are geologically complex, because the migration is performed at a late stage, after the seismic data have been affected by the NMO (normal moveout) or DMO (dip moveout) corrections and CDP (common depth point) stacking. One prestack option is depth migration of common shot gathers, or shot records. This method is thus called "shot record" or "shot profile" migration. Shot record migration can give more accurate imagining, better preserve dip, and provide accurate prestack amplitude information. These properties have made shot record migration one of the more popular methods of wave theory migration.

Shot record migration is described in Reshef, Moshe and Kosloff, Dan, "Migration of common shot gathers", *Geophysics*, Vol. 51, No. 2 (February, 1986), pp. 324-331. Reshef and Kosloff (1986) describe three methods for migrating common-shot records. Discussion of the accuracy and efficiency of shot record migration compared to full pre-stack migration is contained in the two articles: Jean-Paul Jeannot, 1988, "Full prestack versus shot record migration: practical aspects", SEG Expanded Abstracts, pp. 966-968 and C. P. A. Wapenaar and A. J. Berkhout, 1987, "Full prestack versus shot record migration", SEG Expanded Abstracts.

Seismic migration comprises two steps: (1) wave extrapolation and (2) imaging. The present application deals with the second step of imaging in seismic migration. A corresponding method of wave extrapolation in seismic migration is described in co-pending U.S. patent application, "Method for Downward Extrapolation of Prestack Seismic Data", by the same inventor and assigned to the same assignee as the present patent application.

The key elements necessary for an accurate shot record migration may be derived by examining the formal representation for the reflection response from a single, flat interface. Shot record migration is then seen to be the set of operations necessary to invert for the plane-wave reflectivity. After subsequent generalization to the multi-layered case, these elements include (1) definition of the source, (2) extrapolation of the wavefields' phases over depth with an amplitude-compensating algorithm that preserves vertical energy flux, and (3) application of an imaging principle that is based in some way on the definition of reflectivity.

Let the upper half-space contain a point, compressional seismic source with coordinates $x_s \equiv (x_s, y_s, z_s)$ and spectrum $S(\omega)$, and let it also contain seismic receivers, such as hydrophones, with coordinates $x_r \equiv (x_r, y_r, z_r)$. Depth is chosen to be positive downward, and for simplicity assume that $z_r = z_s$. Finally, let the depth of the interface be $z'$. A far-field expression for the pressure of the upgoing (reflected) wavefield, designated by U, is then given by:

$$U(x_r, y_r, z_s, t) \approx (i/c_0^2) \int_{-\infty}^{\infty} S(\omega) \cdot \exp(-i\omega t) \int_{-\infty}^{\infty} \exp[ik_x(x_r - x_s)] \cdot \int_{-\infty}^{\infty} \exp[ik_y(y_r - y_s)] R \left[ \frac{\exp(-2i\omega \xi_0 |z' - z_s|)}{\omega \xi_0} \right] dk_y dk_x d\omega \quad (1)$$

where $c_0$ and $\xi_0 \equiv \xi(c_0)$ are the velocity and vertical slowness in the upper half-space, $\omega$ is the radial frequency, $k_x$ and $k_y$ are horizontal wavenumbers, and R is the plane-wave reflectivity at the reflector. In an acoustic medium, reflectivity R has the simple form:

$$R\left(\frac{k_x}{\omega}, \frac{k_y}{\omega}, z'\right) = \left(\frac{\rho_1}{\xi_1} - \frac{\rho_0}{\xi_0}\right) / \left(\frac{\rho_1}{\xi_1} + \frac{\rho_0}{\xi_0}\right) \quad (2)$$

where $\rho_0$ is the density in the upper half-space and $\rho_1$, $c_1$, and $\xi_1 \equiv \xi(c_1)$ are the density, velocity, and vertical slowness, respectively, in the lower half-space. Likewise, the downgoing wavefield, designated by D, at the reflector depth z' has the form:

$$D(k_x, k_y, z, \omega) \approx (i/c_0^2)S(\omega)\exp[-i(k_x x_s + k_y y_s)]\frac{\exp(-i\omega\xi_0 z)}{\omega\xi_0} \quad (3)$$

Equation (3) provides a representation that is convenient for theoretical analysis, but it is not the most practical form for numerical application. Since extrapolation for shot record migration is commonly performed in the $(\omega,x)$ domain, it is more convenient to represent the source in the same domain. Away from the source, the wavefield is given by the inverse transformation of Equation (3):

$$D(x', \omega) = S(\omega)\frac{\exp(i\omega|x' - x_s|/c_0)}{c_0^2|x' - x_s|} \quad (4)$$

where x'=(x',y',z') specifies the observation point for the wavefield in the subsurface.

Equation (4) can be used in at least two different ways. First, the wavefield can be specified at the bottom of a homogeneous overburden and then downward continued through the underlying, heterogeneous structure. Alternatively, in a land setting, a wavefield can be specified at some shallow depth using the local velocity, reverse-extrapolated back to the surface and then downward continued through the underlying, heterogeneous medium.

Thus, the steps needed to invert the recorded seismic data for the plane-wave reflectivity, R, can be identified. First, the source wavefield is modeled to the reflector depth, perhaps through Equation (4). Second, the upgoing, recorded wavefield (U) is extrapolated to the reflector depth z'. Third, the reflectivity R is computed by $$R(k_x, k_y, z', \omega) = \frac{U(k_x, k_y, z', \omega)}{D(k_x, k_y, z', \omega)} \quad (5)$$

and then inverse transformed back to the spatial domain.

Several imaging principles for shot record migration have been reported in the literature. Five common methods are reviewed. Kinematic imaging principles only require the upgoing, receiver wavefield U, while dynamic imaging principles depend on some functional relationship between both the upgoing and downgoing, source wavefields U and D.

A popular, kinematic approach is given by:

$$R(x) = \frac{1}{n}\sum_{j=1}^{n} U(x, \omega_j)\exp[i\omega_j\tau(x)], \quad (6)$$

where x=(x,y,z) correponds to the image point and $\tau(x)$ is the one-way time from the source to the image point as determined from a ray trace. One can expect it to yield results that are partially subject to the limitations of ray theory. In order to account for spreading effects, factors must be computed from the ray trace and applied in the same manner as for Kirchhoff migration. For a further description of this approach, see, for example, the two articles Reshef, Moshe and Kosloff, Dan, "Migration of common shot gathers", *Geophysics*, Vol. 51, No. 2 (February, 1986), pp. 324-331, or Reshef, Moshe, "Prestack depth imaging of three-dimensional shot gathers", Geophysics, Vol. 56, No. 8, (August, 1991), pp. 1158-1163.

An average correlation in the $(x,\omega)$ domain is given by:

$$R(x) = \frac{1}{n}\sum_{j=1}^{n} [U(x, \omega_j)D^*(x, \omega_j)], \quad (7)$$

where the superscript "*" denotes complex conjugation. This approach will yield poorly-resolved (low frequency), but robust images. However, it does not yield a valid measure of reflectivity. An accurate recovery of divergence effects requires that the reflectivity be computed as some form of a ratio between the source and receiver wavefields.

The classical definition of reflectivity in the $(x,\omega)$ domain is given by a deconvolution:

$$R(x) = \frac{1}{n}\sum_{j=1}^{n} \frac{U(x, \omega_j)}{D(x, \omega_j)}. \quad (8)$$

This imaging condition is very close to the theoretically correct method, which entails a computation in the wavenumber, rather than the spatial, domain. This method can yield "floating point errors" where the source illumination is very weak.

A normalized deconvolution approach in the $(x,\omega)$ domain is given by:

$$R(x) = \frac{1}{n}\sum_{j=1}^{n} \frac{U(x, \omega_j)D^*(x, \omega_j)}{|D(x, \omega_j)|}, \quad (9)$$

where $|D|=(DD^*)^{1/2}$. This algorithm is less sensitive to noise than the deconvolution approach in Equation (8).

After introducing pre-whitening, Equation (9) becomes:

$$R(x) = \frac{1}{n}\sum_{j=1}^{n} \frac{U(x, \omega_j)D^*(x, w_j)}{|D(x, \omega_j)|^2 + \varepsilon}. \quad (10)$$

Equation (10) is probably the most commonly used imaging method in the industry. The pre-whitening term $\epsilon$ stabilizes the solution in the presence of noise. However, it has the undesirable side effect of inhibiting an accurate recovery of geometrical divergence. The optimal value for $\epsilon$ is highly dependent on the data and varies with each shot record and also with spatial position. Considerable testing is thus required to find a single, "best compromise" value. It should be chosen as small as possible while still yielding a stable, clean-looking solution. For an overview of the approaches discussed with reference to Equations (7)-(10), see, for example, Jacobs, Allan, 1982, "The prestack migration of profiles", Ph.D. thesis, Stanford Univ., SEP-34, and the classic book, Claerbout, Jon, "Imaging the Earth's Interior", Blackwell Scientific Publications, Ltd., Oxford, United Kingdom, 1985, 1999.

Valenciano, Alejandro, Biondi, Biondo, and Guitton, Antoine, 2002, "Multidimensional imaging condition for shot profile migration", Stanford Exploration Project, Report SEP-111, Jun. 10, 2002, pp. 71-81, formulate a type of least-squares inverse for the imaging condition in shot record migration. A more robust (smoothed) least-squares inverse might be formulated by considering data at spatially neighboring locations in computing the inverse at location x. However, their inverses are all performed in the time domain, rather than the frequency domain. In the frequency domain, convolution and deconvolution correspond to multiplication and division, respectively. In the time domain, deconvolution involves the construction of matrices with time-shifted operators. The least-squares inverse formed in Valenciano et al. (2002) is based on these matrices.

Valenciano et al. (2002) also propose a simple variation of the pre-whitening factor used in Equation (10) above. A binary (0. or 1.) weight can be added to eliminate $\epsilon$ when the product U·D* exceeds some threshold and retain it when U·D* is unacceptably small. Results in areas of clear imaging would thus not be biased by the pre-whitening, and "floating point errors" would be avoided at other locations.

Thus, a need exists for a method for imaging prestack seismic data in shot record migration that can be fully automated and recover amplitudes in heterogeneous media.

BRIEF SUMMARY OF THE INVENTION

The invention is a method for imaging prestack seismic data. An individual reflectivity is calculated for each frequency in the seismic data. Then, a mean reflectivity is calculating over the individual reflectivities. A variance is calculated for the set of reflectivities versus frequency. A second variance is calculated for the upgoing wavefield, using the mean reflectivity. A spatially varying pre-whitening factor is then calculated, using the variance for the reflectivities and the variance for the upgoing wavefield. Finally, a single reflectivity is calculated at each location, using the spatially varying pre-whitening factor.

BRIEF DESCRIPTION OF THE DRAWINGS

The invention and its advantages may be more easily understood by reference to the following detailed description and the attached drawings, in which.

Figure 1:
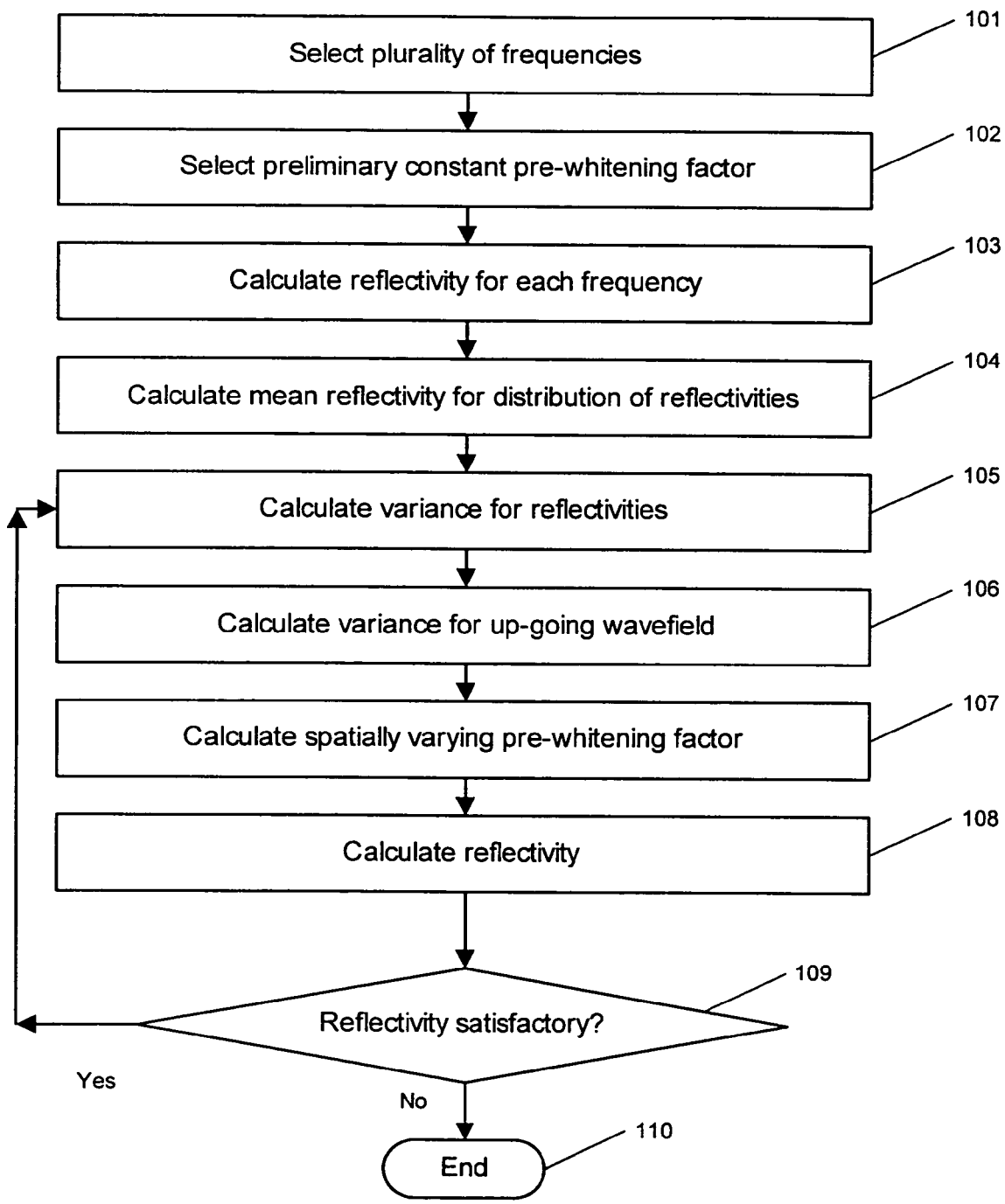
FIG. 1 is a flowchart illustrating the processing steps of an embodiment of the method of the invention for imaging prestack seismic data.

While the invention will be described in connection with its preferred embodiments, it will be understood that the invention is not limited to these. On the contrary, the invention is intended to cover all alternatives, modifications, and equivalents that may be included within the scope of the invention, as defined by the appended claims.

DETAILED DESCRIPTION OF THE INVENTION

The invention is a method for imaging prestack seismic data. The method of the invention is illustrated by two embodiments. The first embodiment is an iterative, non-linear inversion to solve for an optimum, adaptive, spatially variable pre-whitening factor. The second embodiment is a least-squares inversion to determine the optimum reflectivity for the set of all frequencies at each depth.

At each depth and at each lateral coordinate, a dynamic (amplitude-based) imaging principle is applied in order to compute an estimate for the reflection coefficient. One of two imaging methods can be used. The first imaging method computes an average over the set of results for all "upgoing over downgoing" computations, with an added pre-whitening factor in the denominator that automatically adapts to the noise conditions at each location. The adaptation is accomplished by iteratively computing variance estimates for the "data" (receiver wavefield) and "model" (reflectivity). The second imaging method combines a least-squares analysis with an "upgoing over downgoing" computation at each frequency in order to solve for a single reflectivity for the entire set of frequencies.

The analysis is restricted to the usual assumptions associated with one-way wave propagation, i.e., the neglection of multiple reflections and transmission losses. It is also assumed that material properties vary smoothly in space. Within the limits of these assumptions, shot record migration can adequately recover pre-stack amplitudes in heterogeneous media.

Imaging for shot record migration may be developed by examining, for a single interface, the exact reflection response in the (x,t) and (k,ω) domains. Let $x \equiv (x,y,z)$ be the Cartesian coordinates in an infinite, homogeneous, acoustic medium that has velocity c and a point compressional source at $x_s$ with time dependence S(t). Then the two-way scalar wave equation may be written as:

$$\nabla^2 P(x,t) - (1/c^2)\frac{\partial P(x,t)}{\partial t_2} = -(4\pi/c^2)\delta(x-x_s)S(t). \tag{11}$$

The solution to Equation (11) is given by:

$$P(x,t) = \frac{-S(t-|x-x_s|/c)}{c^2|x-x_s|}, \tag{12}$$

where $$|x-x_s| = \sqrt{(x-x_s)^2+(y-y_s)^2+(z-z_s)^2}.$$

Following the convention that the forward Fourier transforms for a function g(x,y,z,t) are given by:

$$g(k_x, k_y, z, \omega) = \int_{-\infty}^{\infty}\int_{-\infty}^{\infty}\int_{0}^{\infty} g(x, y, z, t)\exp[i\omega t - k_x x - k_y y] dy\, dx\, dt,$$

the Weyl integral form of the solution in Equation (12) is:

$$P(x, \omega) = \left(\frac{i}{2\pi c^2}\right) S(\omega) \int_{-\infty}^{\infty} \exp[ik_x(x - x_s)] \cdot \int_{-\infty}^{\infty} \exp[ik_y(y - y_s)] \frac{\exp(-i\omega\xi|z - z_s|)}{\omega\xi} dk_x dk_y, \quad (13)$$

where $$\xi = \sqrt{\frac{1}{c^2} - \frac{k_x^2 + k_y^2}{\omega^2}}.$$

Taking an inverse Fourier transform of Equation (13) over $\omega$ yields:

$$P(x, t) = \left(\frac{i}{4\pi^2 c^2}\right)\int_{-\infty}^{\infty} S(\omega)\exp(-i\omega t)\int_{-\infty}^{\infty} \exp[ik_x(x - x_s)] \cdot \int_{-\infty}^{\infty} \exp[ik_y(y - y_s)] \frac{\exp(-i\omega\xi|z - z_s|)}{\omega\xi} dk_x dk_y d\omega \quad (14)$$

Equation (14) describes the time-dependent field of the direct arrival that is observed at spatial location x, due to the source at $x_s$.

Next, a boundary is introduced at depth z' and the associated reflection response that would be recorded by a seismic receiver, such as a hydrophone, is constructed at $(x_r, y_r, z_r)$. For the sake of convenience, the depth of the receiver is chosen to be the same as that for the source, so $z_r = z_s$. From the "reflectivity method", the reflection response can be obtained by modifying the kernel in Equation (14) to include the plane-wave reflection coefficient for each downgoing wave component. For a single interface at depth z', the reflectivity function depends only on the apparent slownesses $p_x = k_x/\omega$ and $p_y = k_y/\omega$, and it is independent of frequency:

$$R\left(\frac{k_x}{\omega}, \frac{k_y}{\omega}, z'\right) = \left(\frac{1}{\xi_2} - \frac{1}{\xi_1}\right)/\left(\frac{1}{\xi_2} + \frac{1}{\xi_1}\right), \quad (15)$$

where $\xi_1$ and $\xi_2$ are the vertical slownesses in the upper and lower half spaces, respectively. A reflection recording at $(x_r, y_r, z_r = z_s)$ is thus given by:

$$P(x_r, y_r, z_s, t) = \left(\frac{i}{4\pi^2 c^2}\right)\int_{-\infty}^{\infty} S(\omega)\exp(-i\omega t) \int_{-\infty}^{\infty} \exp[ik_x(x_r - x_s)] \cdot \int_{-\infty}^{\infty} \exp[ik_y(y_r - y_s)] R\left(\frac{k_x}{\omega}, \frac{k_y}{\omega}, z'\right) \frac{\exp(-2i\omega\xi_1|z' - z_s|)}{\omega\xi_1} dk_x dk_y d\omega. \quad (16)$$

Thus, the migration of an individual shot record involves the following three operations. First, the source wavefield is forward extrapolated, i.e. modeled, from the depth of the source to the imaging depth. Second, the receiver wavefield is reverse extrapolated from the surface to the imaging depth. Third, an imaging principle is applied, which may be either kinematic or dynamic. Using these three concepts as a guide, the individual wavefields can be identified in the simple, one-layer response. From Equation (13), the forward-extrapolated field of the source at the reflector is given by the downgoing wavefield D:

$$D(k_x, k_y, z', \omega) = (i/4\pi^2 c^2)S(\omega)\exp[-i(k_x x_s + k_y y_s)] \quad (17)$$

$$\frac{\exp(-i\omega\xi_1|z' - z_s|)}{\omega\xi_1}.$$

The factor "$\exp[-i(k_x x_s + k_y y_s)]$" arises from the Fourier transform of the delta-like, lateral position of the source. The factor "$\exp(-i\omega\xi_1|z' - z_s|)$" is the change in phase due to propagation from depth $z_s$ to depth z', and the factor "$1/(\omega\xi_1)$" is a weight over vertical wavenumber for the amplitude of each plane wave. Finally, the factor "$S(\omega)$" corresponds to the Fourier transform of the source wavelet.

Next, using Equation (16), the upgoing wavefield U that is recorded at depth $z_r = z_s$ is identified as:

$$U(k_x, k_y, z_s, \omega) = (i/4\pi^2 c^2)S(\omega)\exp[-i(k_x x_s + k_y y_s)] \quad (18)$$

$$\frac{\exp(-2i\omega\xi_1|z' - z_s|)}{\omega\xi_1} R\left(\frac{k_x}{\omega}, \frac{k_y}{\omega}, z'\right).$$

In order to redatum $U(k_x, k_y, z_s; \omega)$ to the depth of the reflector, U must be extrapolated with reversed sign from depth $z_s$ to depth z':

$$U(k_x, k_y, z', \omega) = U(k_x, k_y, z_s, \omega)\exp(i\omega\xi_1|z' - z_s|) \quad (19)$$

$$= (i/4\pi^2 c^2)S(\omega)\exp[-i(k_x x_s + k_y y_s)]$$

$$\frac{\exp(-i\omega\xi_1|z' - z_s|)}{\omega\xi_1} R\left(\frac{k_x}{\omega}, \frac{k_y}{\omega}, z'\right).$$

Comparing Equations (17) and (19), the downgoing and upgoing wavefields at the reflector thus have the following relationship:

$$U(k_x, k_y, z', \omega) = D(k_x, k_y, z', \omega) \cdot R\left(\frac{k_x}{\omega}, \frac{k_y}{\omega}, z'\right), \quad (20)$$

which yields the imaging condition:

$$R\left(\frac{k_x}{\omega}, \frac{k_y}{\omega}, z'\right) = \frac{U(k_x, k_y, z', \omega)}{D(k_x, k_y, z', \omega)}. \quad (21)$$

As expected, the plane-wave reflectivity is thus given by the ratio of the upgoing and downgoing wave types. However, this relationship strictly holds only in the apparent slowness or wavenumber domains. Inverse Fourier transforms over $k_x$, and $k_y$ yield, to within factors of $\pi$, $$U(x,y,z',\omega) = D(x,y,z',\omega) * R(z,y,z',\omega), \quad (22)$$

where "*" denotes convolution between U and R over both coordinates x and y. Frequency dependence has been retained in Equation (22) in order to accommodate the redundancy afforded by measurements at many frequencies. It is common practice to begin with the asymptotic relationship:

$$U(x,y,z',\omega) = D(x,y,z',\omega) \cdot R(x,y,z',\omega), \quad (23)$$

which yields the alternative imaging condition:

$$R(x, y, z', \omega) = \frac{U(x, y, z', \omega)}{D(x, y, z', \omega)}. \quad (24)$$

Thus, for homogeneous media, an amplitude-recovering shot record migration can be accomplished with the following algorithm, which must be repeated for each depth z'. Construct and extrapolate the source wavefield to each depth, z', by Equation (17). Then, inverse Fourier transform over $k_x$ and $k_y$ to obtain $D(x,y,z';\omega)$. Fourier transform the recorded wavefield $U(x_r,y_r,z_r;\omega)$ over x and y and reverse extrapolate to depth z'. Then inverse Fourier transform over $k_x$ and $k_y$ to obtain $D(x,y,z';\omega)$. Compute $R(x,y,z')$ by Equation (24), either as an average of the ratios over all frequencies, or as an average over power-normalized ratios with pre-whitening, or by least squares, as discussed above.

Equation (21) suggests that imaging should be performed in the wavenumber domain. This is inconvenient, since wavefields extrapolated by finite differencing are normally available in the spatial domain. Furthermore, Equation (21) is only valid for flat layers, since it implicitly includes the assumption of Snell's law for zero dip.

The reflection response in the spatial domain can be expanded in terms of wavefronts. The first order solution, at high frequency, is proportional to the delta-like behavior of the downgoing wavefield. Higher order terms are proportional to Heaviside functions. This analysis would show that, to first order, at high frequency, Equation (24) is a good approximation. One can still expect some degradation in lateral resolution as a result of this approximation where there are rapid lateral changes in reflector properties and, perhaps, for large incidence angles.

Thus, asymptotically, one can argue that it is sufficient to compute the ratio in the $(\omega,x)$ domain. Reflectivities can then be computed independently of dip. Since there is a redundancy of information provided by several discrete frequencies, a first approximation can be to perform an average as follows:

$$R(x) = \sum_{j=1}^{n} \frac{U(x, \omega_j) D^*(x, \omega_j)}{|D(x, \omega_j)|^2 + \varepsilon(x)} \quad (25)$$

where $\epsilon(x)$ is a pre-whitening term, a small number intended to add stability. Equation (25) is analogous to the power-normalized classical definition of reflectivity illustrated in Equation (10) above, but with a pre-whitening term that can vary spatially.

This spatially varying pre-whitening term $\epsilon(x)$ is necessary because, for some frequencies, the illumination |D| may lie at the limit of noise. In this case, the unconditioned reflectivity ratio is non-physical and may be abnormally large. At some spatial locations, this limitation may hold for most or even all of the frequency contributions, which requires that $\epsilon$ should vary with location.

From linear inverse theory, a spatially-variable pre-whitening term ($\epsilon(x)$) can be estimated from an a priori estimate of the variance for the "model" ($\sigma_R^2$) and a measured variance for the "data" ($\sigma_U^2$). Unfortunately, the former estimate is difficult to guess. One can get a reasonably good, initial estimate for $\sigma_R^2$ by first computing individual estimates for R, one for each frequency, and then computing the mean and standard deviation for this distribution. The resulting model variance can then be used, together with $\sigma_U^2$, to obtain a final estimate for R by setting $\epsilon(x) = \sigma_U^2(x)/\sigma_R^2(x)$ in Equation (10).

Thus, the difficulties involved in empirically estimating a spatially varying $\epsilon(x)$ can be handled by the following automated procedure. FIG. 1 shows a flowchart illustrating the processing steps of a first embodiment of the method of the invention for imaging prestack seismic data.

First, at step 101, a plurality of n frequencies ω are selected in the prestack seismic data.

At step 102, a preliminary, constant pre-whitening factor $\epsilon$ is selected. The preliminary pre-whitening factor does not vary spatially, so it's use in Equation (25) is analogous to the simpler estimate of reflectivity in Equation (10).

At step 103, a reflectivity R is calculated for each frequency $\omega_j$ selected in step 101 Preferably, the reflectivities are calculated using Equation (25) with the preliminary, constant pre-whitening factor selected in step 102.

At step 104, a mean reflectivity $<R(x)>$ is calculated over the distribution of reflectivities calculated in step 103. The mean reflectivity is calculated using any appropriate methods, as are well known in the art.

At step 105, a variance for the reflectivity, $\sigma_R^2(x)$, is calculated over the distribution of frequencies calculated in step 103. Preferably, the variance for the reflectivity is calculated using the following equation:

$$\sigma_R^2(x) = \frac{1}{n-1} \sum_{j=1}^{n} \left[ \frac{U(x, \omega_j)}{D(x, \omega_j)} - \langle R(x) \rangle \right]^2. \quad (26)$$

At step 106, a variance for the upgoing wavefield, $\sigma_U^2(x)$, is computed using the mean reflectivity $<R(x)>$, computed in step 104. Preferably, the variance for the upgoing wavefield is computed using the following equation:

$$\sigma_U^2(x) = \frac{1}{n-1} \sum_{j=1}^{n} [U(x, \omega_j) - \langle R(x) \rangle \cdot D(x, \omega_j)]^2. \quad (27)$$

At step 107, a spatially varying pre-whitening factor $\epsilon(x)$ is calculated using the variance for the reflectivity calculated in step 105 and the variance for the upgoing wavefield calculated in step 106. Preferably, the pre-whitening factor is calculated by the following equation:

$$\varepsilon(x) = \frac{\sigma_U^2(x)}{\sigma_R^2(x)}. \quad (28)$$

At step 108, a reflectivity R(x) is calculated. The reflectivity is calculated by reapplying Equation (25) with the spatially varying pre-whitening factor calculated in step 107. Thus, the reflectivity is preferably calculated by the following equation:

$$R(x) = \frac{1}{n} \sum_{j=1}^{n} \frac{U(x, \omega_j) D^*(x, \omega_j)}{|D(x, \omega_j)|^2 + \frac{\sigma_U^2(x)}{\sigma_R^2(x)}}. \quad (29)$$

At step 109, it is determined if the reflectivity R(x) calculated in step 10 is satisfactory. If the answer is no, the reflectivity is not satisfactory, then the process returns to step 105 to calculate another reflectivity value. If the answer is yes, the reflectivity is satisfactory, then the process ends at step 110.

More than one iteration may be necessary, depending on the character of the data. Ideally, several iterations could be performed by cycling through Equations (26)-(29). In the interest of speed, however, the preferred embodiment is to perform only one iteration.

A second embodiment of the method of invention can also be constructed. The imaging principles illustrated in Equations (6)-(10) all represent some average over individual estimates of reflectivity R for each frequency $\omega_j$. Each estimate is the slope of a line, with zero intercept, which relates the upgoing to the downgoing wavefield. The average reflectivity is thus the average of the slopes. As an alternative, the second embodiment of the method of the invention is a least-squares solution for the single slope that minimizes the squared sum of the residuals, subject to the constraint that the line has zero intercept. Now, both D and U are treated as vectors with respect to frequency. Then the inverse problem for the single parameter R takes the form:

$$U(x,\omega_j)=D(x,\omega_j) \cdot R(x). \quad (30)$$

Equation (30) has the least-squares solution:

$$R(x) = \frac{D^H(x) \cdot U(x)}{D^H(x) \cdot D(x)}, \quad (31)$$

where "H" denotes the complex conjugate of the transpose (Hermetian conjugate). Adding a pre-whitening factor $\epsilon$, the inverse in Equation (31) becomes:

$$R(x) = \frac{D^H(x) \cdot U(x)}{D^H(x) \cdot D(x) + \varepsilon}. \quad (32)$$

Using the vector notation of Equation (30), Equation (32) can be rewritten as:

$$R(x) = \frac{\frac{1}{n} \sum_{j=1}^{n} D^*(x, \omega_j) U(x, \omega_j)}{\frac{1}{n} \sum_{j=1}^{n} D^*(x, \omega_j) D(x, \omega_j) + \varepsilon}. \quad (33)$$

In this formulation, it is not necessary to use a spatially-varying pre-whitening factor $\epsilon(x)$. Equation (33) can be applied either in the space or wavenumber domains. Since this new estimate for R is computed as the ratio of sums, rather than as the sum of ratios, one might expect fewer problems with conditioning, even in the absence of the pre-whitening factor $\epsilon$.

Figure 2:
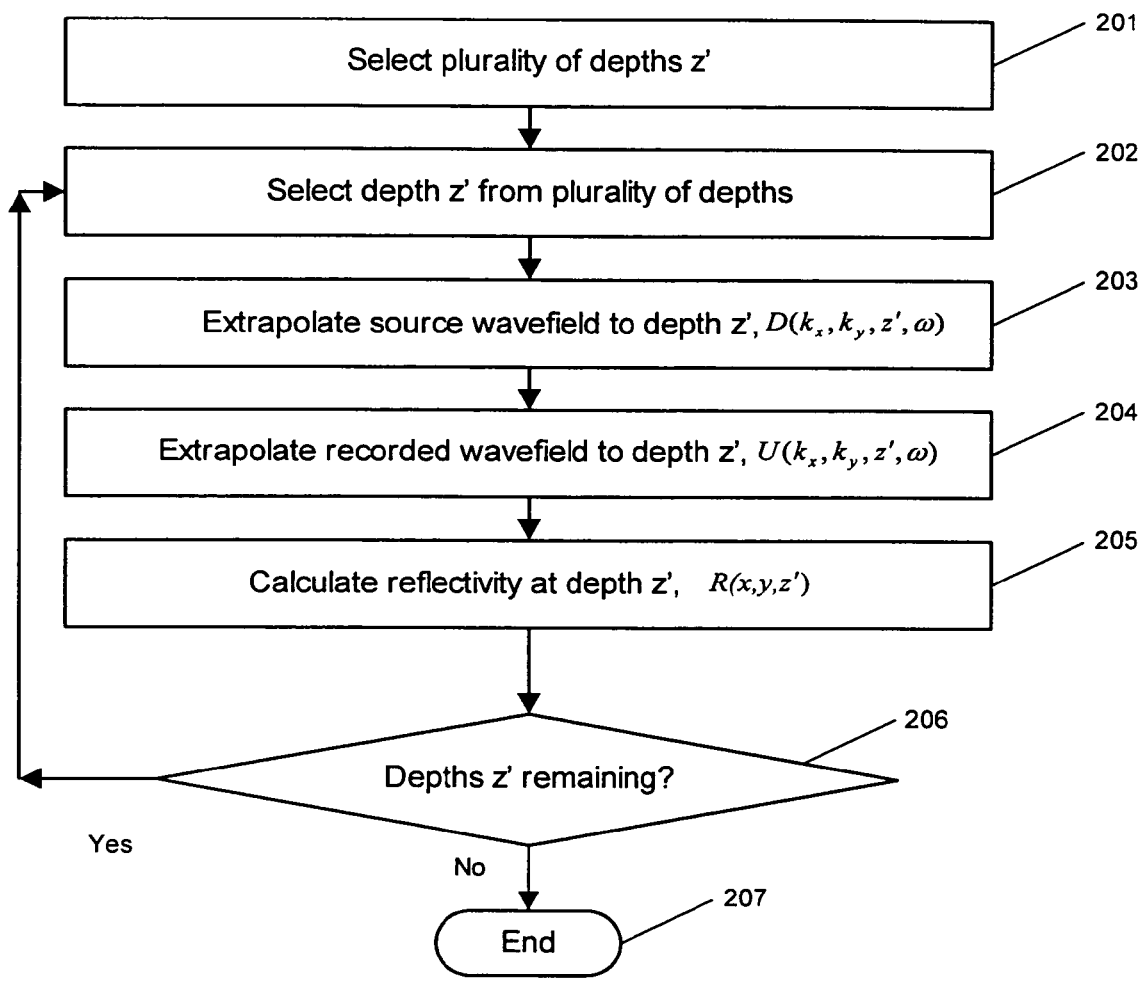
FIG. 2 is a flowchart illustrating the processing steps of an embodiment of the method of the invention for imaging prestack seismic data.

Thus, for heterogeneous media, an amplitude-recovering shot record migration can be accomplished with the following method. FIG. 2 shows a flowchart illustrating the processing steps of an embodiment of the method of the invention for imaging prestack seismic data.

First in step 201, a plurality of depths z' are selected for the prestack seismic data set. The depths are selected from any appropriate source known in the art, such as available velocity models for the seismic data set.

In step 202, a depth z' is selected from the plurality of depths selected in step 201. The depths are selected in a systematic fashion, starting from the top depth and proceeding downward depth by depth through the seismic data set.

In step 203, the source wavefield $D(k_x,k_y,z,\omega)$ is constructed and extrapolated to the depth, z' selected in step 202'. The resulting source wavefield $D(k_x,k_y,z',\omega)$ may be obtained, for example, by Equation (17).

In step 204, the recorded wavefield $U(x_r,y_r,z_r;\omega)$ is Fourier transformed over x and y and reverse extrapolated to depth z'. The resulting wavefield $U(k_x,k_y,z',\omega)$ may be obtained, for example, by Equation (18) and (19).

In step 205, a reflectivity R(x,y,z') is computed at depth z'. The reflectivity may be computed, for example, by Equation (21). The reflectivity may be computed either as an average of the ratios over all frequencies, as an average over power-normalized ratios with pre-whitening, or by least squares. The reflectivity is preferably computed by one of the two embodiments of the invention discussed above. The first embodiment of the invention, a power-normalized ratio with a spatially varying pre-whitening factor, is discussed with reference to Equations (25)-(29) above. The second embodiment of the invention, a least squares method, is discussed with reference to Equation (33) above.

In step 206, it is determined if any depth z' remain to be selected in the plurality of depths selected in step 201. If the answer is yes, depths z' remain, then the process returns to step 202 to select the next depth. If the answer is no, no depths z' remain, then the process ends at step 207.

It should be understood that the preceding is merely a detailed description of specific embodiments of this invention and that numerous changes, modifications, and alternatives to the disclosed embodiments can be made in accordance with the disclosure here without departing from the

I claim:

1. A method for imaging prestack seismic data, comprising:
   calculating an individual reflectivity for each frequency in the seismic data;
   calculating a mean reflectivity over the individual reflectivities;
   calculating a variance for the individual reflectivities;
   calculating a variance for the upgoing wavefield in the seismic data, using the mean reflectivity;
   calculating a spatially varying pre-whitening factor, using the variance for the reflectivities and the variance for the upgoing wavefield; and
   calculating a reflectivity using the spatially varying pre-whitening factor.

2. The method of claim 1, wherein the step of calculating a variance for the upgoing wavefield comprises applying the following equation:

$$\sigma_U^2(x) = \frac{1}{n-1} \sum_{j=1}^{n} [U(x, \omega_j) - \langle R(x) \rangle \cdot D(x, \omega_j)]^2,$$

where $\sigma_u^2(x)$ is the variance for the upgoing wavefield, x is the spatial location, n is the number of frequencies $\omega_j$, $U(x,\omega_j)$ is the upgoing wavefield, $\langle R(x) \rangle$ is the mean reflectivity, and $D(x,\omega_j)$ is the downgoing wavefield.

3. The method of claim 1, wherein the step of calculating a spatially varying pre-whitening factor comprises applying the following equation:

$$\varepsilon(x) = \frac{\sigma_U^2(x)}{\sigma_R^2(x)},$$

where $\varepsilon(x)$ is the spatially varying pre-whitening factor, $\sigma_U^2$ is the variance for the upgoing wavefield, and $\sigma_R^2(X)$ is the variance for the reflectivities.

4. The method of claim 1, wherein the step of calculating a reflectivity using the spatially varying pre-whitening factor comprises applying the following equation:

$$R(x) = \frac{1}{n} \sum_{j=1}^{n} \frac{U(x, \omega_j) D^*(x, \omega_j)}{|D(x, \omega_j)|^2 + \frac{\sigma_U^2(x)}{\sigma_R^2(x)}},$$

where R(x) is the reflectivity, x is the spatial location, n is the number of frequencies $\omega_j$, $U(x,\omega_j)$ is the upgoing wavefield, $D(x,\omega_j)$ is the downgoing wavefield, $\sigma_U^2$ is the variance for the upgoing wavefield, and $\sigma_R^2(x)$ is the variance for the reflectivities.

5. A method for imaging prestack seismic data, comprising:
   constructing a downgoing wavefield for each frequency in the seismic data;
   constructing an upgoing wavefield for each frequency in the seismic data;
   calculating a reflectivity at a spatial location from the downgoing and upgoing wavefields using a least squares approach with a pre-whitening factor,
   wherein the least squares approach comprises applying the following equation:

$$R(x) = \frac{\frac{1}{n} \sum_{j=1}^{n} D^*(x, \omega_j) U(x, \omega_j)}{\frac{1}{n} \sum_{j=1}^{n} D^*(x, \omega_j) D(x, \omega_j) + \varepsilon},$$

where R(x) is the reflectivity, x is the spatial location, n is the number of frequencies $\omega_j$, $U(x,\omega_j)$ is the upgoing wavefield, $D(x,\omega_j)$ is the downgoing wavefield, and $\varepsilon$ is the pre-whitening factor.

* * * * *